United States Patent [19]
Toji

[11] 3,862,116
[45] Jan. 21, 1975

[54] DEHYDROTHIO-P-TOLUIDINESULFONIC ACID AZO-HEXAHYDRO-4,6-DIOXOPYRIMIDINEUREA OR CYANAMIDE DIRECT DYES FOR PAPER

[75] Inventor: Masuo Toji, Sewell, N.J.

[73] Assignee: E. I. du Pont de Nemours and Company, Wilmington, Del.

[22] Filed: Jan. 3, 1972

[21] Appl. No.: 215,215

[52] U.S. Cl............... 260/154, 8/7, 117/154, 260/260, 260/304
[51] Int. Cl............ C09b 29/36, D21h 3/80
[58] Field of Search................ 260/158, 154

[56] References Cited
UNITED STATES PATENTS

| | | | |
|---|---|---|---|
| 1,667,327 | 4/1928 | Mayer et al. | 260/158 |
| 2,140,536 | 12/1938 | McNally et al. | 260/154 X |
| 2,140,537 | 12/1938 | McNally et al. | 260/154 X |
| 2,140,538 | 12/1938 | McNally et al. | 260/154 X |
| 2,675,375 | 4/1954 | Marson et al. | 260/154 |
| 2,692,263 | 10/1954 | Taube | 260/154 |
| 2,746,951 | 5/1956 | Taube | 260/154 |
| 3,179,650 | 4/1965 | Wehrli et al. | 260/158 |
| 3,210,190 | 10/1965 | Anderau et al. | 260/152 X |
| 3,426,010 | 2/1969 | Dunworth | 260/158 |
| 3,579,498 | 5/1971 | Dynworth | 260/158 |
| 3,726,851 | 4/1973 | Litke | 260/154 |

Primary Examiner—Floyd D. Higel
Attorney, Agent, or Firm— Costello

[57] ABSTRACT

Yellow dyes, having good substantivity, bleedfastness and bleachability on paper, having the structure

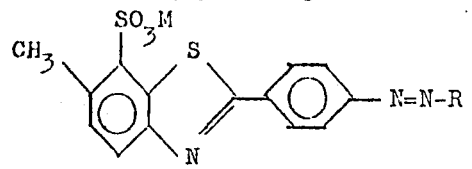

where M is H, Li, Na, K, $NH_4$, or ammonium substituted with groups selected from $C_{1-4}$ alkyl and $C_{1-4}$ hydroxyalkyl and R is the residue of a coupling component prepared by condensing a malonic ester with a compound selected from the group consisting of dicyanadiamide and guanylurea.

3 Claims, No Drawings

DEHYDROTHIO-P-TOLUIDINESULFONIC ACID AZO-HEXAHYDRO-4,6-DIOXOPYRIMIDINEUREA OR CYANAMIDE DIRECT DYES FOR PAPER

BACKGROUND OF THE INVENTION

1. Field of the Invention

This invention relates to novel azo dyes. More specifically, this invention relates to yellow azo dyes which have good substantivity, bleed-fastness and bleachability on paper.

2. Description of the Prior Art

The paper-making industry is constantly seeking low cost, substantive dyes for the coloration of paper tissues, napkins and towelling. Such products are dyed without the use of mordants such as rosin size and alum, and thus require dyes with a high degree of substantivity. Furthermore, the dyes should not bleed readily from paper, i.e., they should show negligible or no stain on a piece of damp, undyed piece of cloth or paper when pressed against it. These requirements are becoming increasingly important with the current trend to dye such disposable paper products in deeper, more decorative shades.

A paper dye must also be bleachable, so that the dyed trimmings from the paper sheet-forming process can be bleached and reused in any desired shade, including white. Good fastness to light is not important for paper tissues and the like, but is nevertheless desirable since it increases the versatility of the dye and allows it to be used on other, more durable paper products.

It is an objective of this invention to provide bright yellow dyes for paper. It is a further objective to provide dyes of good substantivity and fastness to bleeding. It is a still further objective to provide dyes of good bleachability and fastness to light. These and other objectives will be apparent from the following description and claims.

SUMMARY OF THE INVENTION

In accordance with the invention, new dyes have been discovered which may be represented by the structure

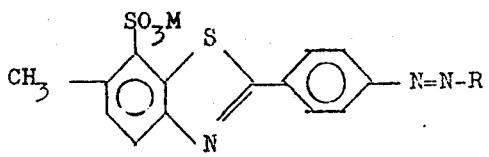

wherein M is H, Li, Na, K, NH$_4$ or ammonium substituted with groups selected from C$_1$–C$_4$ alkyl and C$_1$–C$_4$ hydroxyalkyl and R is the residue of a coupling compound prepared by condensing a malonic ester with a compound selected from the group consisting of dicyandiamide and quanylurea.

The dyes of this invention are prepared by diazotizing an amine of the formula

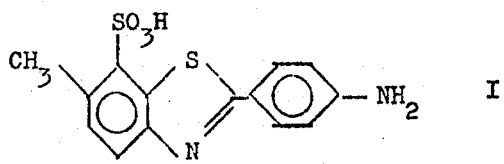

and coupling the diazonium salt thus produced to the condensation product of a malonic ester and a compound selected from the group consisting of dicyandiamide nd guanylurea. Said condensation product may have the formula

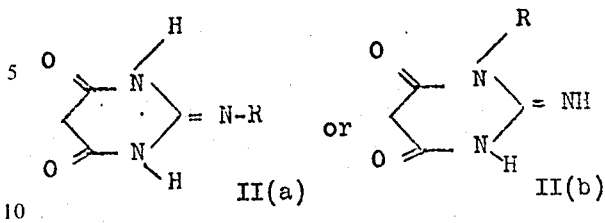

(where R is CN or CONH$_2$).

The amine represented by formula I is dehydrothio-p-toluidenesulfonic acid and is well known in the art. The two coupling compounds, represented by formula II(a) or formula II(b), may be prepared as described for closely related compounds in German Pat. Nos. 165,223 and 187,990 to Bayer and exemplified below.

Diazotization of the amine may be effected by dissolving or slurrying it in an aqueous alkali at a pH of about 9–10 and adding a 5–10% molar excess of sodium nitrite. The solution or slurry is then added to dilute mineral acid, preferably hydrochloric acid, at 10°–25°C. After addition is complete, the reaction mixture should be acid to Congo Red paper (pH 2.8 or less). The diazo preparation may then be added to a slurry or solution of the coupler at a temperature of 0°–50°C. and at a pH of 3–10 but preferably at 4–8. The resulting dye may then be used as a solution, or may be isolated as a solid by spray-drying or by salting out of solution and isolating by filtration.

The nature of the cation, represented by M, associated with the dye may be selected at will by isolating the diazonium salt of the amine, prepared as described above, by filtration and washing thoroughly with water. The solid diazonium compound is then added to a slurry or solution of the coupler in water containing a basic salt or hydroxide of lithium, sodium, potassium, ammonium or one or more organic amines. Representative examples of the organic amines defined as C$_1$–C$_4$ alkylamines include triethylamine, diethylamine and N-methyl propylamine. Representative examples of C$_1$–C$_4$ hydroxyalkylamines or C$_1$–C$_4$ alkanolamines include N,N-dimethylethanolamine, N,N-diethylethanolamine, diethanolamine, N-methyl or N-ethyldiethanolamine, triethanolamine and diisopropanolamine. Since it is desirable, both economically and for ease of handling at the mill, to use the subject dyes as a liquid reaction mass, triethanolamine is the preferred base since the corresponding cation confers good water solubility of the dyes.

The subject dyes are tinctorially strong and produce bright yellow shades on paper. A comparison of the dyes of this invention with other dyes showed the dyes of this invention to have superior tinctorial strength. Their bleed-fastness on unsized paper is good, and is markedly improved in deep shades when the dyes are applied in conjunction with a cationic retention agent, such as "Pontamine" Retention Agent A (a cationic ureaformaldehyde resin). The dyes exhibit only a slight degree of "bottom-sidedness" (i.e., a rather heavier shade on the lower surface) on fine paper that contains clay as a filler. The clay filler tends to be more predominant on the top surface of such paper, since it is retained there by the fibers in the paper pulp during the formation of the paper sheet. Dyes that have significantly more affinity for the paper than the clay when used to color such paper will exhibit bottom-sidedness. This is undesirable for the reasons that:

a. The aesthetics of the paper are diminished and
b. more dye will be required to achieve a given depth of shade on the upper surface.

The following examples further illustrate the invention. Parts given are by weight unless otherwise specified.

EXAMPLE 1

To a solution of 92 parts of sodium in 1,000 parts of ethanol were added 320 parts of diethyl malonate and 168 parts of dicyandiamide. The mixture was heated at the reflux temperature for 10 hours. The thick slurry was poured into 2,000 parts of cold water and the mass was acidified to pH 2.0 with concentrated sulfuric acid. The resulting white solids were collected by filtration, washed with water and dried, yielding 348 parts of product, m.p. >300°C. An infrared spectrum of the product revealed peaks at 4.52, 5.94 and 6.15 $\mu$. This product is believed to be hexahydro-4,6-dioxo-$\Delta^{2,N}$-pyrimidinecyanamide, formula II(a) where R = —CN.

EXAMPLE 2

To a solution of 35 parts of sodium in 600 parts of ethanol were added 80 parts of diethyl malonate and 76 parts of guanylurea sulfate. The mixture was then heated at the reflux temperature for 5 hours. The reaction mass was drowned in 800 parts of cold water and acidified to pH 2.3 with concentrated hydrochloric acid. The resulting white solids were collected by filtration, washed with water and dried, yielding 114 parts of product, m.p. >300°C. An infrared spectrum of the product showed peaks at 3.05, 3.17, 5.82 and 6.24 $\mu$. The product is believed to be hexahydro-4,6-dioxo-$\Delta^{2,1}$-pyrimidineurea, formula II(a) where R = CONH$_2$.

EXAMPLE 3 a. A slurry containing 32 parts of dehydrothio-p-toluidinesulfonic acid, 6.8 parts of potassium hydroxide, 7.6 parts of sodium nitrite and 100 parts of water was added to a mixture of 25.5 parts of concentrated hydrochloric acid and 50 parts of ice and agitated for 1 hour. The precipitated diazonium salt was isolated by filtration and washed well with water. The solids were then slurried with 15.2 parts of the coupling component prepared according to Example 1 and 200 parts of water. Triethanolamine was then added dropwise until a constant pH of 7.0 was obtained. The temperature rose to 40°C. during the coupling reaction. After stirring for 1 hour at 50°C., the solution was diluted with water to 340 parts. A visible spectrum indicated an absorptivity of 16.8 liters g.$^{-1}$ cm.$^{-1}$ at 428 m$\mu$. Based on the above procedure, the probable structure of the dye is

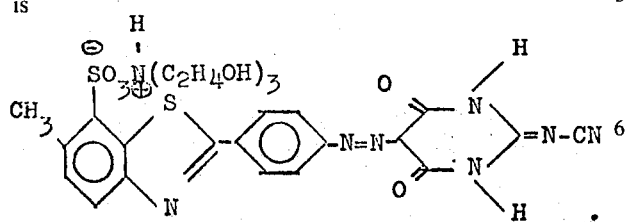

b. To 190 parts of the solution from part (a) above were added 53.5 parts of 10% sodium chloride solution. After stirring for a few minutes, 40 parts of isopropanol were added and the mixture was stirred until precipitation was complete. The solids were collected by filtration, washed with 50% (v/v) aqueous isopropanol and dried. A yellow, chromatographically pure solid was obtained, having an absorptivity of 87.5 liters g.$^{-1}$ cm.$^{-1}$ at 427 m$\mu$. The dye has the probable structure

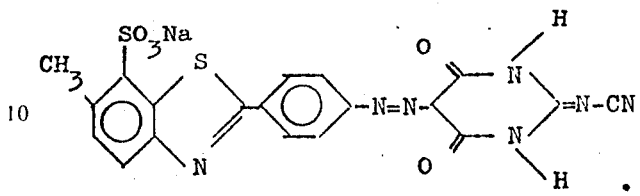

EXAMPLE 4

Thirty-two parts of dehydrothio-p-toluidinesulfonic acid were diazotized and isolated as described in Example 3. The solid diazonium salt was slurried with 17 parts of the coupling component prepared according to Example 2 and 200 parts of water. Triethanolamine was added dropwise until a constant pH of 7 was obtained. After stirring the reaction mass for 2 hours, 115 parts of 20% sodium chloride solution were added. The precipitated solids were collected by filtration, washed with 50% aqueous isopropanol and dried, yielding 81 parts of chromatographically pure dye. The dye had an absorptivity of 51.0 liters g.$^{-1}$ cm.$^{-1}$ at 420 m$\mu$. The probable structure of the dye is

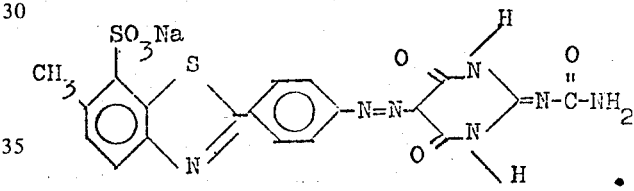

EXAMPLE 5

Beater Dyeing of Paper a. One thousand parts of bleached sulfite pulp were dispersed in 18,000 parts of water. Seventy parts of the dye solution prepared in Example 3(a) were added and the mixture was agitated for about 0.5 hour. Paper sheet was then formed by conventional procedures to yield paper which was dyed a yellow shade. The dye displayed excellent substantivity. Fastness of the dyed paper to bleeding and to light were good.

b. The above procedure was repeated except that the dye of Example 3(a) was replaced with 10 parts of the dye of Example 4. The resulting paper sheet was dyed a reddish-yellow shade. The substantivity and fastness properties of the dye were similar to those of the dye of Example 3(a).

c. The procedure of part (a) above was repeated using 250 parts of the dye solution of Example 3(a) and 40 parts of "Pontamine" Retention Agent A. Fastness of the deeply yellow-dyed paper to bleeding in the presence of water, 50% aqueous ethanol, milk and dilute aqueous detergent was excellent.

d. Part (c) was repeated using 40 parts of the dye of Example 4 in place of the dye of Example 3(a). The resulting paper sheet was dyed a deep, reddish-yellow shade with slightly superior bleed-fastness to that of the foregoing example.

EXAMPLE 6

Production of Dyed Clay-filled Paper a. One thousand parts of bleached sulfite pulp and 100 parts of china clay were dispersed in 18,000 parts of water. Seventy parts of the dye solution of Example 3(a), 15 parts of rosin size and 25 parts of Paper Makers' Alum (commercial aluminum sulfate, $Al_2(SO_4)_3 \cdot 18H_2O$) were added and the mixture was agitated for about 0.5 hour. Paper sheet was then formed by conventional means. The yellow-dyed paper exhibited a slight degree of bottom-sidedness. The shade was somewhat redder than that of the dyed paper of Example 1(a).

b. The above procedure was repeated using 10 parts of the dye of Example 4 in place of the dye of Example 3(a). The resulting reddish-yellow paper was somewhat less bottomsided than that of Example 6(a).

Surprisingly, a dye which differs from the subject dyes only in having barbituric acid itself as the coupling component shows noticeably more bottom-sidedness than the subject dyes when used to dye paper by the same procedure.

If desired, the novel dyes of this invention may be used for the coloration of paper in the presence of wet strength agents or in the presence of dye retention aids other than those mentioned above, which agents and aids are well known in the art of paper making. Although dyeings may be performed at pH values of about 7, it is preferred to use additives in the dye liquor which provide a pH of about 6 or below. Ordinary rosin size contains both free rosin and sodium rosinate, and its solution has a pH of about 11–12. A solution of Paper Makers' Alum has a pH of about 3. Thus, by mixing these two additives, one readily adjusts the pH of the dye liquod to the desired value of about pH 6, or lower for sized papers.

EXAMPLE 7

Bleaching Process

Five parts of colored paper, prepared as described in Example 5(a), and 95 parts of water were agitated at ambient temperature. Calcium (or sodium) hypochlorite was added to provide 2% available chlorine, based on the air-dry weight of the colored paper. The slurry was agitated for 5 minutes and then diluted with cold water to provide a 0.5% concentration of paper fiber in the slurry. Paper sheet was then made up according to the manner well known in the art of paper making to provide paper which was free of color.

When deeply colored paper, such as that of Example 5(c), is bleached, the amount of available chlorine used in the present example is increased to about 4%.

The beater dyeing method for the coloration of paper is well known in the art of paper making. A specific application is shown in Example 7. The beater, used in paper manufacture, is defined in the Van Nostrand Chemists Dictionary, 1953, page 69, as "... a tank in which the pulpwater mixture is agitated and cut by means of rotating blades, until the fibers have been separated and reduced in length to the degree desired before they pass to the four-drinier (the actual sheet-forming apparatus)." An extensive discussion of the beater dyeing method is found in the book, Pulp and Paper Manufacture, Volume 2, Preparation of Stock for Paper Making, McGraw-Hill, 1951, pages 492 to 509.

EXAMPLE 8

Tinctorial Strength a. Example 3(a) was repeated, except that after coupling was complete, the resulting dye was isolated by spray-drying. Buy using this procedure, the dye could be obtained in a very high state of purity.

The procedure was repeated twice, except that the coupling component of Example 1 was replaced by an equimolar amount of the coupling component of Example 2 and barbituric acid, respectively.

b. The three resulting dyes were then applied separately to paper, with and without rosin size, according to the procedures described in Example 5(a) and Example 6(a) but without the china clay. The dye derived from barbituric acid was applied at a strength of 18 pounds of dye per 1,000 pounds of bleached sulfite pulp. In the presence of size and alum, it took 10 pounds of each of the subject dyes, per 1,000 pounds of pulp, to match the strength of the paper dyed with the first dye; in the absence of size and alum, it took 12 pounds of each dye to match the strength of the first dye.

These results indicate that it requires at least half as much again of the dye derived from barbituric acid to match the strength of either of the subject dyes on paper.

The foregoing detailed description has been given for clarity of understanding only and no unnecessary limitations are to be understood therefrom. The invention is not limited to exact details shown and described for obvious modifications will occur to one skilled in the art.

What is claimed is:

1. A dye of the structure

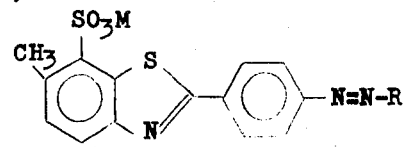

wherein M is H, Li, Na, K, $NH_4$, $C_1$–$C_4$ secondary or tertiary alkylamine or $C_1$–$C_4$ secondary or tertiary hydroxyalkylamine and R is selected from the group consisting of

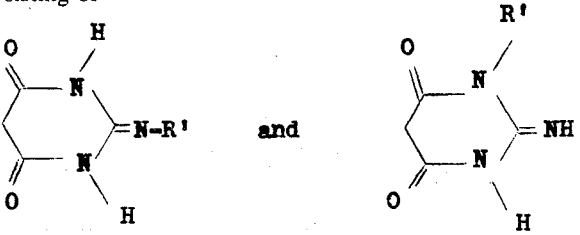

where R' is CN or $CONH_2$.

2. A dye according to claim 1 wherein R' is CN.

3. A dye according to claim 2 wherein M is the tri(hydroxyethyl)ammonium.

* * * * *